United States Patent [19]
Bond et al.

[11] Patent Number: 5,056,605
[45] Date of Patent: Oct. 15, 1991

[54] MULTIPURPOSE CUTTING MEANS

[76] Inventors: William R. Bond, 4710 Asdee Ln.; Daniel L. Markley, 2613 Davis Ford Rd., 190 72, both of Woodbridge, Va. 22192

[21] Appl. No.: 605,279

[22] Filed: Oct. 30, 1990

[51] Int. Cl.5 .......................................... A01B 33/06
[52] U.S. Cl. ................................... 172/111; 172/254; 172/523; 172/555; 30/347; 83/851; 56/295; 56/255
[58] Field of Search ................... 172/110, 111, 13, 27, 172/254, 41, 42, 43, 118, 120, 123, 540, 522, 523, 526, 555; 56/255, 295; 30/347; 83/851

[56] References Cited

U.S. PATENT DOCUMENTS

| | | | |
|---|---|---|---|
| D. 253,470 | 11/1979 | Sheldon | 172/111 |
| 835,371 | 11/1906 | Smith | 172/548 |
| 1,025,693 | 5/1912 | Franklin . | |
| 1,093,894 | 4/1914 | Stone | 172/108 |
| 1,230,783 | 6/1917 | Sackett . | |
| 1,673,184 | 6/1928 | Cady | 172/555 |
| 2,312,569 | 3/1943 | Maga | 172/15 |
| 2,352,127 | 6/1944 | Sheldon | 172/555 |
| 2,547,540 | 4/1951 | Roberts . | |
| 2,651,159 | 9/1953 | Rountree . | |
| 2,657,620 | 11/1953 | Meeks . | |
| 2,720,071 | 10/1955 | Watanabe . | |
| 2,745,331 | 5/1956 | Lancour . | |
| 2,891,369 | 6/1959 | Rietz . | |
| 2,943,687 | 7/1960 | Merry et al. | 172/123 |
| 3,031,018 | 4/1962 | Smithers | 172/41 |
| 3,080,697 | 3/1963 | Mauro | 56/295 |
| 3,128,837 | 4/1964 | Arndt | 172/123 |
| 3,183,655 | 5/1965 | Dunlap et al. | 56/255 |
| 3,243,944 | 4/1966 | Michaud | 56/295 |
| 3,375,764 | 4/1968 | Petersen | 172/123 |
| 3,477,515 | 11/1969 | Kiemele et al. | 172/96 |
| 3,702,638 | 11/1972 | Takata | 172/540 |
| 3,724,182 | 4/1973 | Long et al. | 56/295 |
| 4,047,876 | 9/1977 | Rau et al. | 172/540 |
| 4,062,408 | 12/1977 | Enters et al. | 172/123 |
| 4,093,166 | 4/1978 | Haas | 56/13.7 |
| 4,276,940 | 7/1981 | Kirkegaard | 172/42 |
| 4,280,565 | 7/1971 | van der Lely | 172/548 |
| 4,286,675 | 9/1981 | Tuggle | 173/163 |
| 4,318,260 | 3/1982 | Szymanis | 56/255 |
| 4,346,764 | 10/1982 | Rossi | 172/123 |
| 4,421,176 | 12/1983 | Tuggle et al. | 172/41 |
| 4,651,510 | 3/1987 | Malutich | 56/295 |
| 4,715,173 | 12/1987 | Anderson | 56/295 |
| 4,765,127 | 8/1988 | Hamblen | 56/255 |
| 4,782,731 | 11/1988 | Huntington | 56/255 |
| 4,801,332 | 2/1985 | Straayer | 172/41 |
| 4,862,682 | 9/1989 | Wait et al. | 56/255 |
| 4,967,596 | 11/1990 | Forbush | 56/255 |

FOREIGN PATENT DOCUMENTS

| | | | |
|---|---|---|---|
| 300642 | 1/1989 | European Pat. Off. | 56/295 |
| 802866 | 10/1958 | United Kingdom | 172/42 |

Primary Examiner—Dennis L. Taylor
Assistant Examiner—Spencer Warnick
Attorney, Agent, or Firm—Clyde I. Coughenour

[57] ABSTRACT

A multipurpose cutting device for use with power drives is disclosed. Specific and different blade configurations are provided on opposite sides of an elongated bar or a disk type support for performing different cutting functions. By securing one side of the elongated bar or disk to the end of a shaft, one function can be performed. By securing the other opposite side of the elongated bar or disk to the shaft a different function can be performed. By securing or using the elongated bar or disk at an angle to the material being cut both blade configurations can be used simultaneously to perform yet another function. The blades on the one side and the blades on the other side of the elongated bar or disk may each have the blade configuration facing in one direction of rotation of one shape and the configuration facing in the other direction of another shape for different cutting characteristics when the direction of rotation is reversed.

20 Claims, 2 Drawing Sheets

MULTIPURPOSE CUTTING MEANS

BACKGROUND OF THE INVENTION

1. Field of the Invention

The invention is to a multipurpose reversible cutting means for use on rotary power drives. Power driven vehicles and hand-held devices are in common use for driving cutting blades used for earth working, harvesting, trimming, mulching, rooting and other functions. One problem encountered with the prior cutting blades is their limited use. A different blade must be purchased, stored and maintained for each function performed. This results in an expensive inventory of blades that are frequently misplaced and misused. The invention overcomes the above-mentioned problems by providing a cutting means that can perform several different cutting functions.

2. Description of the Prior Art

Agricultural vehicles have employed various type blades for weeding, digging-up root crops, removing tops, cutting crops and vegetation, etc., for a century or more. The cutting blades have been used individually and in parallel and tandem configurations. More recent trends have been to provide small powered vehicles and hand-held power driven devices with cutting blades for yard and garden use. Tillers and weeders are examples of the two most commonly used. It has been proposed that these devices be made convertible for different uses, U.S. Pat. No. 4,286,675 issued Sept. 1, 1981 to L. Tuggle and U.S. Pat. No. 4,501,332 issued Feb. 26, 1985 to R. Straayer are examples of converting string cutters to blade cutters.

Elongated bar and disk type cutters are popular and right angle cutting blades have been used, U.S. Pat. No. 4,862,682 issued Sept. 5, 1989 to T. Walt et al and U.S. Pat. No. 1,025,693 issued May 7, 1912 to C. Franklin and, U.S. Pat. No. 2,891,369 issued June 23, 1959 to E. Rietz. Elongated bar and disk type cutters with bent blades having a cutting edge offset from and parallel to the bar or disk on one or both sides of the disk support have also been used, U.S. Pat. No. 3,243,944 issued Apr. 5, 1966 to E. Michaud, U.S. Pat. No. 2,312,569 issued Mar. 2, 1943 to J. Maga, and U.S. Pat. No. 4,280,565 issued July 28, 1981 to C. van der Lely. Having both right angle cutting blades and offset parallel blades on the same side of the disk has also been provided by U.S. Pat. No. 2.745,331 issued May 15, 1956 to L. Lancour. Different blade configurations on opposite sides of a disk have been patented as shown by U.S. Pat. No. 2,651,159 issued Sept. 8, 1953 to J. Rountree and U.S. Pat. No. 4,715,173 issued Dec. 29, 1987 to J. Anderson. It is also known that different blade shapes on opposite sides of a rotary support can be reversed for different cutting characteristics as shown by U.S. Pat. No. 3,080,697 issued Mar. 12, 1963 to D. Mauro. None of these patents individually or collectively teach or make obvious the multipurpose cutting means with plural uses as taught by the present invention. The prior art does not teach different type cutting blades on either side of an elongated support for individually performing different cutting functions by reversal of the side the blade is supported on, nor different shaped blades on the same side of an elongated support for different cutting characteristics by blade rotation reversal, nor different shaped cutting blades on either side of an elongated support cooperating for material discharge, nor different shaped blades on either side of an elongated support assisting in material discharge while simultaneously performing different cutting functions.

SUMMARY OF THE INVENTION

The present invention is to a multipurpose cutting means that is an improvement over the blades of the prior art. The cutting means is provided with an extended support in the form of an elongated bar or disk type support with a centrally located means that permits securement to the end of a shaft from either side for rotation in either direction, or permits securement onto the central or inner portion of a shaft for rotation in either direction. The cutting means can be used in the horizontal or vertical or angled position. The blades on one side of the disk are angled outward from the support extremity for breaking up earth for planting, mulching, or weeding, etc. The blades on the second side of the disk are angled outwardly from the support and then bent so as to extend generally parallel to and outwardly away from the support center to form a second cutting configuration. Each blade on the one side of the extended blade support and each blade on the second side of the extended support can have different shape blade edge cutting configurations on the cutting edges facing in the same direction of rotation. With this provision four different cutting actions can be provided for different materials. The blades can be used for above surface horizontal cutting or for below surface weeding or root cutting, or can be positioned vertically or at an angle for edging, trimming, topping, etc. By using the blade in the angled or vertical position, both sets of blades can be used simultaneously to cut and chop earth, brush or vegetation or for trenching, preparation for planting, mulching, etc. The elongated support or disk surface and its extremity and the angled blade portions of the second side blades can be used as stops for penetration control. The blades can be angled to provide contact discharge control or air current circulation for cut material discharge control when either one or both of the blade configurations are cutting. Either blade alone can be designed for discharge control or they both can be designed to work in concert. The working blade can be designed to throw the material cut in one direction while the nonworking blade creates air circulation to assist.

Accordingly, it is the object of the present invention to provide:

an elongated or disk type support with different blade configurations on each side for optional individual use;

an elongated or disk type support with different blade configurations on each side for optional concurrent use;

an elongated or disk type support with different blade configurations on each side for performing the functions previously performed by several different blades;

an elongated bar or disk type blade support that can be attached for vertical or horizontal or angular use to perform various functions previously requiring several different cutting blades;

an elongated or disk type support with different blade configurations on each blade adapted for different materials or functions;

an elongated or disk type support with different blade configurations such that at least four different cutting actions can selectively be performed.

DETAILED DESCRIPTION OF THE PREFERRED EMBODIMENT

Figure 1:
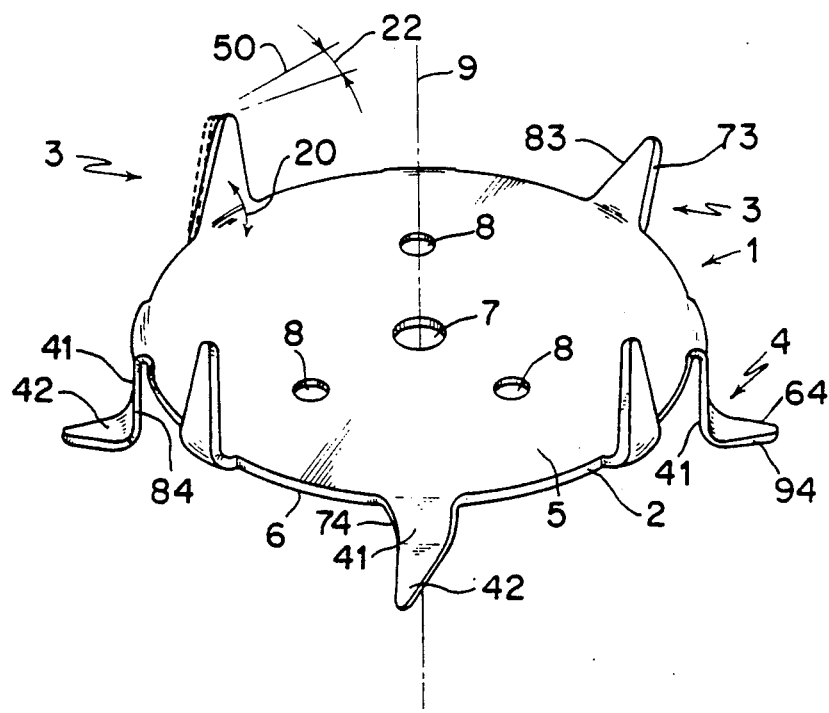
FIG. 1 is a perspective view of the disk type cutter support with different cutting blade configurations on either side.
Figure 2:
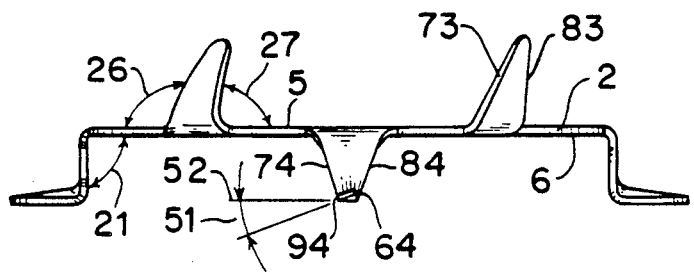
FIG. 2 is an end view of the disk type cutting means of FIG. 1.
Figure 6:
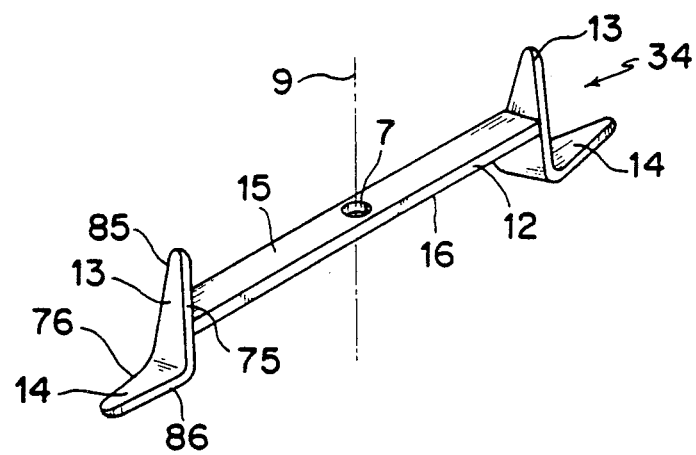
FIG. 6 is a perspective view of an alternative embodiment of the invention wherein the blades are attached at the same location to an elongated support.

In accordance with the present invention, a multipurpose cutting means 1 having an extended support with cutting blades in the form of a disk 2 is shown in FIGS. 1 and 2 and in the form of an elongated bar support 12 is shown in FIG. 6. The disk 2 and elongated bar 12 have centers with axis of rotation 9, a first surface 5, 15 a second surface 6, 16 and outer extremities. At the center, apertures 7 and/or 8 are provided for mounting the support to a power drive means 98. The extremity of support disk 2 has first cutting blades 3 on and protruding from the first surface 5 and second cutting blades 4 on and protruding from the second surface 6. The elongated bar support 12 is provided with similar shaped but unitary blades 34 that have blade sections 13 and 14 that correspond to blades 3 and 4 respectively. The blade sections 13 and 14 essentially protrude outwardly from the surfaces 15 and 16 at the support outer extremity. The mounting means permit the extended supports 2 and 12 to be attached to a rotary power means 98 from either the first side 5 or 15 or from the second side 6 or 16 for either clockwise or counterclockwise rotation. The blades 3 and 4 and 34 have a wide and a first 74, 75, 83, 94 and a second 64, 73, 84, 85 narrow dimension. The blades are attached to the extended support so that the wide dimension extends essentially parallel to the direction of rotation.

The blades can be attached to the elongated bar or disk type support by any of the common joining means such as welding, molding, bolts, stamping, etc. The actual size of the disk type or elongated bar support and the number of and size of and extent of the blades are optional and can all be dimensioned and shaped to meet specific needs and power availability. For simplicity, cost and strength, it is preferred that the disk support and blades be made of one piece construction by bending or stamping, drilling and grinding. On the first side of the disk, the first blades 3 are formed or attached so as to be at an angle 20 with the first support side. It is desired that this angle 20, between the plane of the disk first side 5 and blade 3, be from 90 to 135 degree with an angle of 90 to 120 degrees preferred. On the other side of the disk, the second blades 4 are formed with a first section 41 and a second section 42. The first section 41 is formed or attached to the extended support extremity at an angle 21, between the plane of the extended support second side and second blade, of from 90 to 135 degrees with 90 to 120 degrees preferred. The second blades second section 42 is bent outwardly from the first section 41 to be essentially parallel to the plane of the cutting support second surface. For cut control and to provide discharge by contact or air currents, the wide dimension of blades 3 can be bent at an angle 22 of from ±1 to 20 degrees with respect to a plane of rotation about the axis 9 shown as a line 50 tangent to the support disk extremity. As can be seen in FIG. 1 this places one edge or narrow dimension 73 of the first blade 3 closer to the axis of rotation 9 than the other 83. The wide dimension of the second section 42 of blade 4 can be bent at an angle 51 of ±1 to 20 degrees in a plane perpendicular to the axis of rotation 9 shown as a line 52 parallel to the disk second surface 6. As can be seen in FIG. 2, this places one edge or narrow dimension 64 of the second blade 4 second section 42 closer to the second side 6 than the other 94. With the blades bent in this manner, the blades 3 can provide air currents to assist discharge control while blades 4 are cutting and blades 4 can provide discharge control while blades 3 are cutting.

It is preferred to have the blades 3 protrude from the first side and the blades 4 protrude from the second side alternately and uniformly around the extremity of the disk 2 as shown in FIG. 1. The blades 3 and 4 can be attached to the extended support 2 or 12 at the same location or even be of a single unitary construction 34 attached to the support at a midsection of the blade 34. Such latter unitary blades 34 can be welded to the ends of an elongated support 12, as shown in FIG. 6, or even to a standard horizontally rotated grass cutting blade.

One or both edges or narrow dimensions 73, 83 of blade 3 may be sharpened. If both edges are sharpened forming first 73 and second 83 first cutting blade cutting edges cutting can be performed with either clockwise or counterclockwise rotation. Similarly, both edges 64, 94 of blade 4 second section 42 may be sharpened forming first 94 and second 64 second section cutting edges. In addition, edges 74 and 84 of blade 4 first section 41 may be sharpened forming first 74 and second 84 first section cutting edges. The wide dimension of portion 41 of blade 4 and the disk edge and surfaces 5 and 6 may be used as limit means for cut depth. When depth penetration is a major concern, it may be desirable to omit sharpened edges from 74 and 84 of blade 4.

The cutting blades 3, 4 and 34 may have all of the edges or narrow dimensions essentially parallel or perpendicular to the axis of rotation of the extended blade support or all angled with respect thereto. As an alternative the cutting blades 3 and 34 may be shaped differently. Any of the known cutting blade shapes may be used. As an example, one edge or narrow dimension 73, 74, 75, can be essentially parallel to the axis of rotation 9 and one edge or narrow dimension 86, 94 can be essentially perpendicular to the axis of rotation 9 of the extended blade support 2 or 12 forming a first cutting area of one shape. The angle 27 can be from 80 to 100 degrees, for example. The other edge or narrow dimension 64, 76, 83, 84, 85 can be formed at an angle to a plane through the axis of rotation 9 forming a second cutting area of another different shape. The angle 26 can be from 110 to 135 degrees, for example. When the extended support is rotated each blade will have a leading and a trailing edge. In these configurations, rotation of the blades in one direction, such as clockwise, provides a more desirable cutting action for one material, such as hard soil, while rotation of the blades in the opposite direction, such as counterclockwise, provides a more desirable cutting action for another material, such as loose branches or roots.

Figure 3:
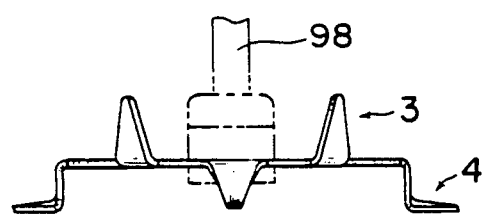
FIG. 3 is a side view showing the disk type cutting means ready for use in a horizontal position with the second blade configuration in cutting position.
Figure 4:
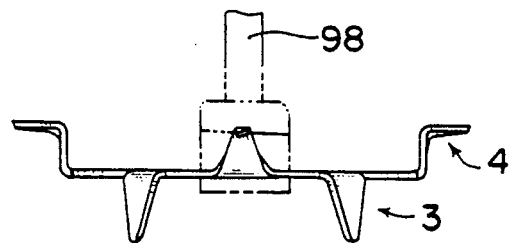
FIG. 4 is a side view showing the disk type cutting means ready for use in a horizontal position with the first blade configuration in cutting position.
Figure 5:
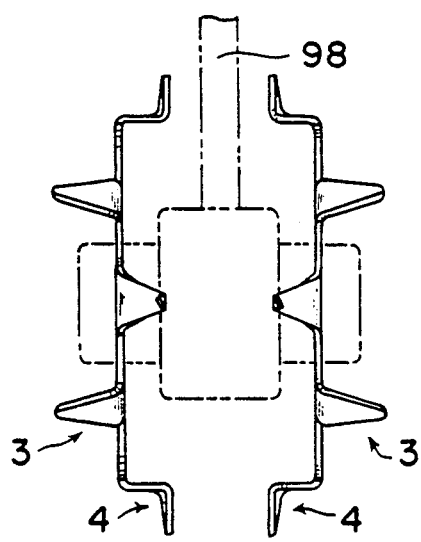
FIG. 5 is a front view showing two of the disk type cutting means positioned in the vertical cutting position for concurrent cutting by both blade configurations.

In use, the rotary power means 98 can be attached to the extended support side 5 with blades 3 projecting toward the rotary power means and cutting blades 4 projecting outwardly for cutting using blades 4 as shown in FIG. 3 or, in the alternative, the rotary power means 98 can be attached to the second disk side 6 having blades 4 projecting toward the rotary power means and blades 3 projecting outwardly therefrom for cutting using blades 3 as shown in FIG. 4. With either of the above attachments, both blade configurations can be used simultaneously by tilting the support. With the blades 4 projecting outwardly as shown in FIG. 3, the blades are particularly useful for topping root crops, subsurface weeding, trimming vegetation, edging, or cutting for sod removal. With the blades 3 projecting outwardly as shown in FIG. 4, the blades are particularly useful for soil breaking, weeding and mulching. As still another alternative, one or more of the extended blade support cutting means may be attached to a shaft that extends through the center of the disk so that both sets of blades work together simultaneously as shown in FIG. 5. This configuration is particularly useful for tilling or trenching. In FIG. 5 the disks are shown with like blades 4 facing each other and like blades 3 facing away from each other to balance the forces exerted on and generated by the blades during cutting.

It is believed that the construction, operation and advantages of this device will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

What we claim is:

1. A multipurpose cutting means comprising:
   an essentially planar extended support for cutting blades having a first side, a second side, a center and extremities, means near said center for mounting said extended support to a rotary power means for rotating said extended support about an axis of rotation that is essentially perpendicular to the plane of said extended support and that passes through said center, for rotation about said center;
   first cutting blades attached to said extremities of said extended support, each said first cutting blade protruding outwardly at an angle from said first side so that mounting said extended support to a rotary power means on said second side provides a first cutting action by said first cutting blades when said extended support is rotated about said axis of rotation and moved parallel to its plane of rotation and that of the material being cut;
   second cutting blades attached to the extremities of said extended support, each, said second cutting blade including a first and a second section, said first section of said second cutting blade protruding outwardly at an angle from said second side, said second section of said second cutting blade protruding outwardly at an angle from said first section and away from said extended support center and said axis of rotation such that said second section is essentially parallel to said extended support second side, said second section being an integral continuation of said first section such that mounting said extended support to said rotary power means on said first side provides a second different cutting action by said second cutting blades when said extended support is rotated about said axis of rotation and moved parallel to its plane of rotation and that of the material being cut, and such that mounting said extended support to said rotary power means on either said first side or said second side and rotating it provides a still further and different cutting action by said first and said second cutting blades when said extended support is moved at an angle that is not parallel to either the plane of rotation of said extended support or the surface of the material being cut.

2. A multipurpose cutting means as set forth in claim 1 wherein said first cutting blades have a wide dimension and a first and a second narrow dimension and said second cutting blades have a wide dimension and a first and a second narrow dimension and said angles between both said extended support first side and said first cutting blade wide dimension and between said extended support second side and said second cutting blade first section wide dimension are between 90 and 135 degrees.

3. A multipurpose cutting means as set forth in claim 2 wherein said first cutting blade first narrow dimension leads and said first cutting blade second narrow dimension trails when said second side of said extended support is attached to said rotary power means and rotated in a clockwise direction and said first cutting blade second narrow dimension leads and said first cutting blade first narrow dimension trails when said extended support is rotated in a counterclockwise direction, and wherein said first narrow dimension of said first cutting blade forms a first cutting area on said first cutting blade of one shape and said second narrow dimension of said first cutting blade forms a second cutting area on said first cutting blade of another shape different from that of said first cutting area such that one type cutting is best performed by clockwise rotation of said extended support about said axis of rotation and another different type cutting is best performed by counterclockwise rotation of said extended support about said axis of rotation.

4. A multipurpose cutting means as set forth in claim 3 wherein said first cutting area of said first cutting blade is sharpened to form a first edge essentially parallel to said extended support axis of rotation and said second cutting area of said first cutting blade is sharpened to form a second edge that is not parallel to said blade extended support axis of rotation and wherein said second cutting blade second section first narrow dimension leads and said second cutting blade second section second narrow dimension trails when said first side of said extended support is attached to said rotary power means and rotated in a clockwise direction and said second section second narrow dimension leads and said second section first narrow dimension trails when said extended support is rotated in a counterclockwise direction and said first leading narrow dimension of said second cutting blade second section in said clockwise direction of rotation is essentially perpendicular to said extended support axis of rotation and said second narrow dimension of said second cutting blade second section leading in said counterclockwise direction of rotation is not perpendicular to said extended support axis of rotation.

5. A multipurpose cutting means as set forth in claim 1 wherein said extended support is a disk with said first and said second cutting blades spaced along the periphery of said disk.

6. A multipurpose cutting means as set forth in claim 5 wherein said first and said second cutting blades are uniformly and alternately spaced about the periphery of said disk.

7. A multipurpose cutting means as set forth in claim 6 wherein said first and said second cutting blades and said disk are of integral one piece construction.

8. A multipurpose cutting means as set forth in claim 5 wherein said angles between both said disk first side and said first cutting blades and between said disk second side and said second cutting blades first section are between 90 and 120 degrees.

9. A multipurpose cutting means as set forth in claim 8 wherein said first cutting blade and said second cutting blade first section and second section each have a wide dimension and a first and a second narrow dimension and said first cutting blade wide dimension is essentially parallel to said axis of rotation but with said first cutting blade wide dimension being angled by ±1 to 20 degrees from parallel with respect to said axis of rotation such that one of said first and second cutting blade narrow dimensions is closer to said axis of rotation than the other, and said second cutting blade second section wide dimension is in a plane that is essentially perpendicular to said axis of rotation of said disk but with said second cutting blade second section wide dimension being angled by ±1 to 20 degrees from perpendicular to said axis of rotation such that one of said first and second cutting blade second section narrow dimensions is closer to said second side than the other.

10. A multipurpose cutting means as set forth in claim 9 wherein both said first and said second narrow dimensions of said first cutting blade and both said first and said second narrow dimensions of both said first section and said second section of said second cutting blade are sharpened to form cutting edges.

11. A multipurpose cutting means as set forth in claim 10 wherein said first cutting blade first narrow dimension leads and said first cutting blade second narrow dimension trails when said second side of said extended support is attached to said rotary power means and rotated in the clockwise direction and said first narrow dimension of said first cutting blade forms a first cutting area of one shape and wherein said first cutting blade second narrow dimension leads and said first cutting blade first narrow dimension trails when rotated in the counterclockwise direction and said second narrow dimension of said first cutting blade forms a second cutting area of another different shape for different cutting characteristics during clockwise and counterclockwise rotation.

12. A multipurpose cutting means as set forth in claim 1 wherein a said first cutting blade and a said second cutting blade are attached at the same location on said extended support extremity.

13. A multipurpose cutting means as set forth in claim 12 wherein said first cutting blade and said second cutting blade are integral.

14. A multipurpose cutting means as set forth in claim 13 wherein said second cutting blade second section has a wide dimension and a first and second narrow dimension and said wide dimension is essentially parallel to the plane of said extended support second side but said cutting blade second section wide dimension is angled from ±1 to 20 degrees to a plane parallel to said extended support second side such that one of said first and second narrow dimensions of said second section is closer to the plane of the extended support second side than the other narrow dimension of said second section to assist discharge of cut material.

15. A multipurpose cutting means as set forth in claim 14 wherein each first cutting blade has a wide and a first and a second narrow dimension and with said second side of said extended support mounted on said rotary power means and rotated in the clockwise direction one of said first and second narrow dimensions of said first cutting blade leads and the other trails and each second cutting blade second section has one of said second section first and second narrow dimensions leading and the other second section narrow dimensions trailing in said clockwise direction of rotation and said leading narrow dimension of said first cutting blade in said clockwise direction of rotation forms a first cutting area of one shape and said trailing narrow dimension of said first cutting blade forms a second cutting area of another different shape and said leading narrow dimension of said second cutting blade second section forms a first cutting area of one shape and said trailing second section narrow dimension of said second cutting blade forms a second cutting area of another different shape for different cutting characteristics during clockwise and counterclockwise rotation.

16. A multipurpose cutting means as set forth in claim 15 wherein said first cutting blade wide dimension is essentially parallel to said extended support axis of rotation but said first cutting blade wide dimensions is angled from ±1 to 20 degrees from parallel such that one narrow dimension of said first cutting blade is closer to said extended support axis of rotation than the other narrow dimension of said first cutting blade to assist discharge of cut material.

17. A multipurpose cutting means as set forth in claim 1 wherein said extended support is in the form of an elongated bar and said first cutting blades each have a wide dimension and a first and a second narrow dimension and said second cutting blades second sections each have a wide dimension and a first and a second narrow dimension, said first cutting blade wide dimension being essentially parallel to said axis of rotation but said first cutting blade wide dimension being angled from ±1 to 20 degrees from parallel such that one of said first and second first cutting blade narrow dimensions is closer to said axis of rotation than the other to assist discharge of cut material.

18. A multipurpose cutting means as set forth in claim 17 wherein said second cutting blade second section wide dimension is essentially parallel to said elongated bar second side but said cutting blade second section wide dimension is angled from ±1 to 20 degrees to a plane parallel to said elongated bar second side such that one of said first and second narrow dimensions of said second section is closer to said second side than the other to assist discharge of cut material.

19. A multipurpose cutting means as set forth in claim 18 wherein with said second side mounted on said rotary power means and rotated in the clockwise direction each of said first cutting blades and each of said second cutting blades second sections has one of said first or second narrow dimensions leading and the other trailing and said leading narrow dimension of said first cutting blade in said clockwise direction of rotation forms a first cutting area of one shape and said trailing narrow dimension of said first cutting blade forms a second cutting area of another different shape and said leading narrow dimension of said second cutting blade second section forms a first cutting area of one shape and said trailing second section narrow dimension of said second cutting blade forms a second area of another different shape for different cutting characteristics during clockwise and counterclockwise rotation.

20. A multipurpose cutting means as set forth in claim 19 wherein the shape of said one leading narrow dimension of said first cutting blade in said clockwise direction of rotation is essentially parallel to said axis of rotation and the shape of said one leading narrow dimension of said second cutting blade second section in said clockwise direction of rotation is essentially perpendicular to said axis of rotation and said trailing narrow dimension of said first cutting blade and said trailing narrow dimension of said second cutting blade second section are neither parallel or perpendicular to said elongated support axis of rotation in said clockwise direction of rotation.

* * * * *